(12) United States Patent
Miller

(10) Patent No.: US 7,222,360 B1
(45) Date of Patent: May 22, 2007

(54) CONTINUOUS BIOMETRIC AUTHENTICATION USING FRAME PREAMBLE FOR BIOMETRIC DATA

(75) Inventor: Eric E. Miller, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 853 days.

(21) Appl. No.: 10/307,110

(22) Filed: Nov. 27, 2002

(51) Int. Cl.
*G06F 7/04* (2006.01)
*H04K 1/00* (2006.01)
*G06F 15/173* (2006.01)
*G06F 9/00* (2006.01)

(52) U.S. Cl. .................. 726/3; 713/186; 709/225; 709/229; 709/230; 726/14

(58) Field of Classification Search .......... None
See application file for complete search history.

(56) References Cited

U.S. PATENT DOCUMENTS

| | | | |
|---|---|---|---|
| 5,229,764 A | 7/1993 | Matchett et al. | |
| 5,465,290 A | 11/1995 | Hampton et al. | |
| 5,910,988 A | 6/1999 | Ballard | |
| 6,163,616 A | 12/2000 | Deldman | |
| 6,167,517 A * | 12/2000 | Gilchrist et al. | 713/186 |
| 6,483,932 B1 | 11/2002 | Martinez et al. | |

OTHER PUBLICATIONS

Hamid Karimi, "New spec will help secure LANs", Aug. 30, 1999, Network World, pp. 1-3.*
Mihir Bellare, et al. *Message Authentication Using Hash Functions—The HMAC Construction*, RSA Laboratories' CryptoBytes, vol. 2, No. 1, Spring 1996, pp. 1-5.

* cited by examiner

*Primary Examiner*—Ayaz Sheikh
*Assistant Examiner*—Trang Doan

(57) ABSTRACT

A client connected to a network switch is continuously authenticated to a network switch by using biometrics, wherein the client and the network switch exchange Ethernet/802.3 frames associated with a client application, and wherein the client and the network switch are coupled by a full-duplex Ethernet/802.3 communication channel. A biometric data sample of a user of the client is captured. Biometric data is encapsulated in an authentication protocol message frame. The authentication protocol message frame is separated into a sequence of a plurality of fragments, each fragment having a predetermined number of bytes. Respective sequence numbers are assigned to each of the fragments. Each of the fragments is inserted with its respective sequence number in a respective preamble of a respective one of a plurality of Ethernet/802.3 frames associated with the client application that are being transmitted from the client to the network switch.

19 Claims, 6 Drawing Sheets

| Code | Ident | Length |
|---|---|---|
| Type | Biometric Variance Data | ... |

| HMAC-MD5 | | |
|---|---|---|
| HMAC-MD5 continued | | |
| HMAC-MD5 continued | | |
| HMAC-MD5 continued | | |
| Code | Ident | Length |
| Type | Biometric Variance Data | |

| 1 Byte | 4 Bytes | 2 Bytes |
|---|---|---|
| Seq. # | Authenticated EAP Fragment | Unused Preamble |

CONTINUOUS BIOMETRIC AUTHENTICATION USING FRAME PREAMBLE FOR BIOMETRIC DATA

CROSS REFERENCE TO RELATED APPLICATIONS

The present application is related to U.S. application Ser. No. 10/306,582, entitled "Biometric Authentication of a Client Network Connection," filed concurrently herewith.

STATEMENT REGARDING FEDERALLY SPONSORED RESEARCH

Not Applicable.

BACKGROUND OF THE INVENTION

The present invention relates in general to security of a computer network, and, more specifically, to transmission of substantially continuous biometric data within a local area network (LAN) for securing a port on a LAN switch without reducing available bandwidth of a network link.

Biometric authentication involves the use of physical and/or behavioral characteristics of individuals to identify them and to control access to places or things, such as ATM's or other computerized equipment, or more specifically, applications running on that equipment. Biometrics has certain advantages over conventional authentication techniques (e.g., user IDs and passwords, PIN codes, and encoded identification cards) since there is nothing to remember or to carry which might be stolen. Among the many biometric technologies in use are fingerprint analysis, hand geometry analysis, retina scanning, iris scanning, signature analysis, facial recognition, keystroke analysis, and voice analysis.

Based on an original measurement of a biometric characteristic (i.e., enrollment), a person's identity can thereafter be verified automatically when requesting access to a computer application or other resource by re-sampling the characteristic and comparing the biometric data with the enrollment data. If a sufficiently close match is found, then the identity is verified. In addition to verification of an identity, biometric systems can also be employed to compare biometric data from an unidentified person with a database of biometric samples of a group of individuals in order to potentially identify that person from the group.

After a biometric sensor acquires raw data of a desired characteristic, the data is typically processed mathematically in order to extract and format the meaningful features and to compress the data. Comparison of the processed verification or identification data with previously processed and stored enrollment data typically involves a mathematical analysis to quantify the "closeness" of the two data samples. A sensitivity threshold is chosen to delineate how close the samples must be in order to call them a match.

As described in co-pending application Ser. No. 10/306,582, biometric authentication is used to secure a network resource connection itself (e.g., a connection to an Ethernet switch or a wireless access point) so that no network activities involving the network resource other than the authentication activities (e.g., biometric authentication) of the present invention may be conducted from the access point. After this initial authentication is successfully completed, the switch or access point allows other traffic through the port. The authenticated client typically launches a client application that involves network communication.

In certain types of network applications, it may be desirable to periodically (i.e., substantially continuously) monitor the user to ensure that a different person is not substituted for the authenticated user, such as is shown in copending application Ser. No. 10/274,934, filed Oct. 21, 2002, entitled "Verification of Identity and Continued Presence of Computer Users," now U.S. Pat. No. 6,810,480, issued Oct. 26, 2004 incorporated herein by reference. When substantially continuous biometric re-authentication is performed, however, increased processing and/or network traffic loads are created. In the local area network link between the client and its LAN switch or wireless access point, for example, the bandwidth needed for sending continuous biometric sample data together with the bandwidth used by the client application could exceed the bandwidth capability of the link, which may noticeably impair performance of the client application.

SUMMARY OF THE INVENTION

The present invention has the advantage of transmitting substantially continuous biometric data over a LAN link without a reduction of the available bandwidth for other applications or processes running on the LAN link. The invention exploits unused bandwidth within the preamble of an Ethernet/802.3 frame to carry biometric data.

In one aspect of the invention, a method is provided for continuous biometric authentication of a client connected to a network switch, wherein the client and the network switch exchange Ethernet/802.3 frames associated with a client application, and wherein the client and the network switch are coupled by a full-duplex Ethernet/802.3 communication channel. A biometric data sample of a user of the client is captured. Biometric data is encapsulated in an authentication protocol message frame. The authentication protocol message frame is separated into a sequence of a plurality of fragments, each fragment having a predetermined number of bytes. Respective sequence numbers are assigned to each of the fragments. Each of the fragments is inserted with its respective sequence number in a respective preamble of a respective one of a plurality of Ethernet/802.3 frames associated with the client application that are being transmitted from the client to the network switch.

DETAILED DESCRIPTION OF PREFERRED EMBODIMENTS

Figure 1:
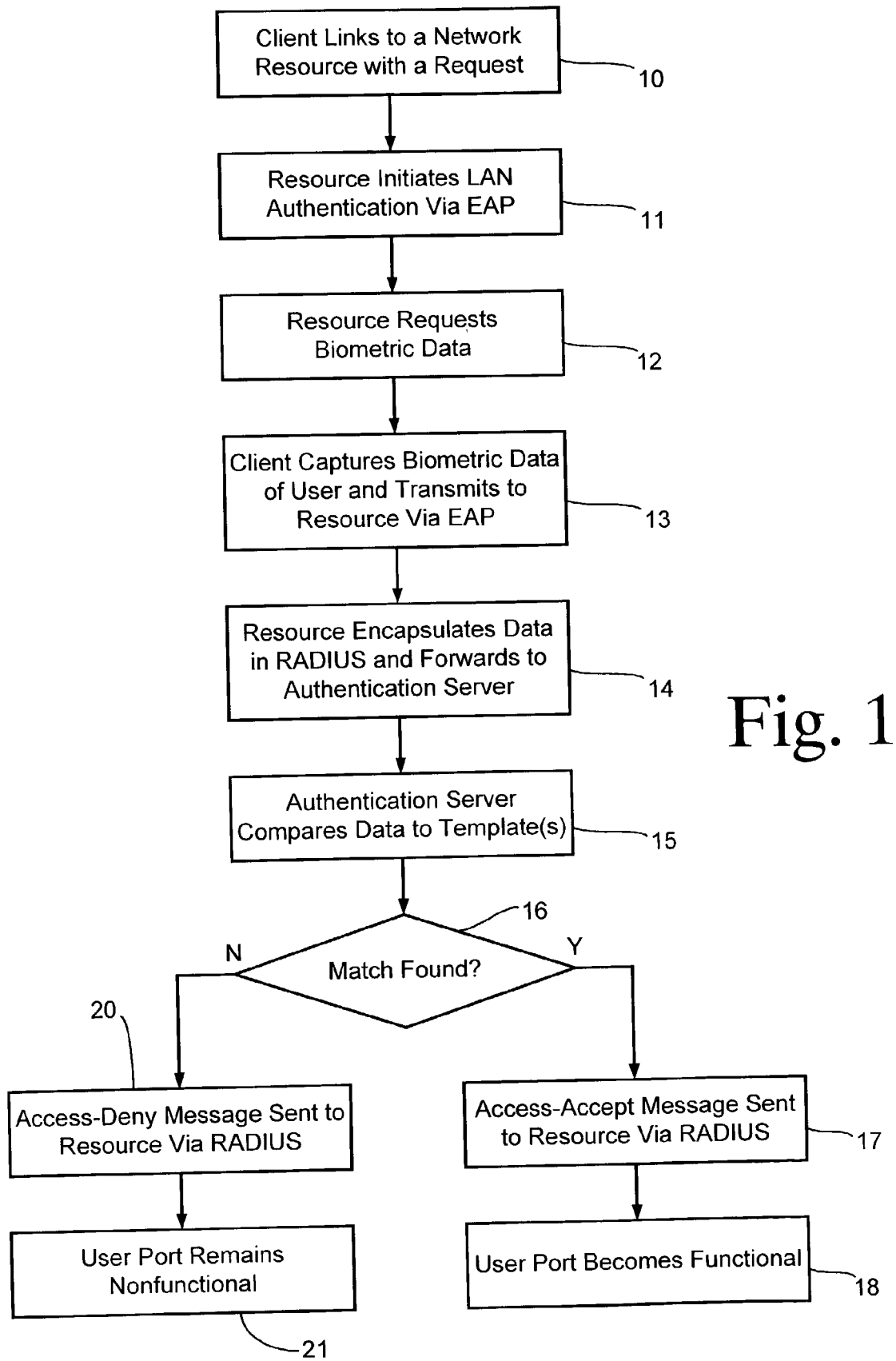
FIG. 1 is a flowchart showing one preferred method for performing an initial biometric authentication of a user.

Referring to FIG. 1, a method for performing an initial biometric authentication begins in step 10 when a client links into a network resource and issues a request for access. For example, a laptop computer is connected to an Ethernet/802.3 cable which is connected at the other end to an Ethernet/802.3 switch within a LAN, or a laptop with a wireless interface moves into the coverage area of a wireless access point with the LAN. Thus, the network resource which the client desires to use may be the switch or access point themselves which act as a gateway to the other resources within the LAN. The attendant user (i.e., person) of the client (e.g., laptop) attempts an interaction with the LAN which results in a request message to the LAN such as a DHCP request or a request for a connection with some other resource. In response to the physical link, the resource acting as an authenticator initiates point-to-point LAN authentication of the client using extensible authentication protocol (EAP) in step 11.

As used herein, Ethernet/802.3 refers to hardware and/or software compliant with Ethernet V2.0, the IEEE 802.3 specification, or ISO standard IS88023 which are the basis for most conventional LAN's.

In step 12, the resource/authenticator requests biometric data from the client via an EAP message. The client captures biometric sample data of the attendant user in step 13 and transmits the data to the resource/authenticator via another EAP message. In order to avoid the need for extensive computing capabilities for authentication functions to be resident in the resource (e.g., switch or wireless access point), these functions are preferably performed remotely. Thus, the resource encapsulates the biometric data into messages within a remote authentication dial-in user service (RADIUS) protocol and forwards them to an authentication server in step 14. In step 15, the authentication server initiates the actual comparison of the biometric data with previously acquired and stored biometric templates of authorized users.

In step 16, a determination is made whether a biometric match is found which would indicate that the user should be granted access to the desired resource. If such a match is found, then an ACCESS-ACCEPT message is sent to the resource/authenticator via the RADIUS protocol in step 17. The client is granted access to the desired network resource in step 18 such that the user port (e.g., a physical port on a LAN switch or a virtual or logical port on a wireless access point) becomes functional for exchanging network messages other than the authentication messages. For example, the client launches a client application such as a browser, a file transfer application, or a database application for exchanging traffic with other nodes over the network.

If no match is found in step 16, then an ACCESS-DENY message is sent to the resource in step 20 and the user port remains nonfunctional in step 21 for any network traffic other than authentication messages.

Figure 2:
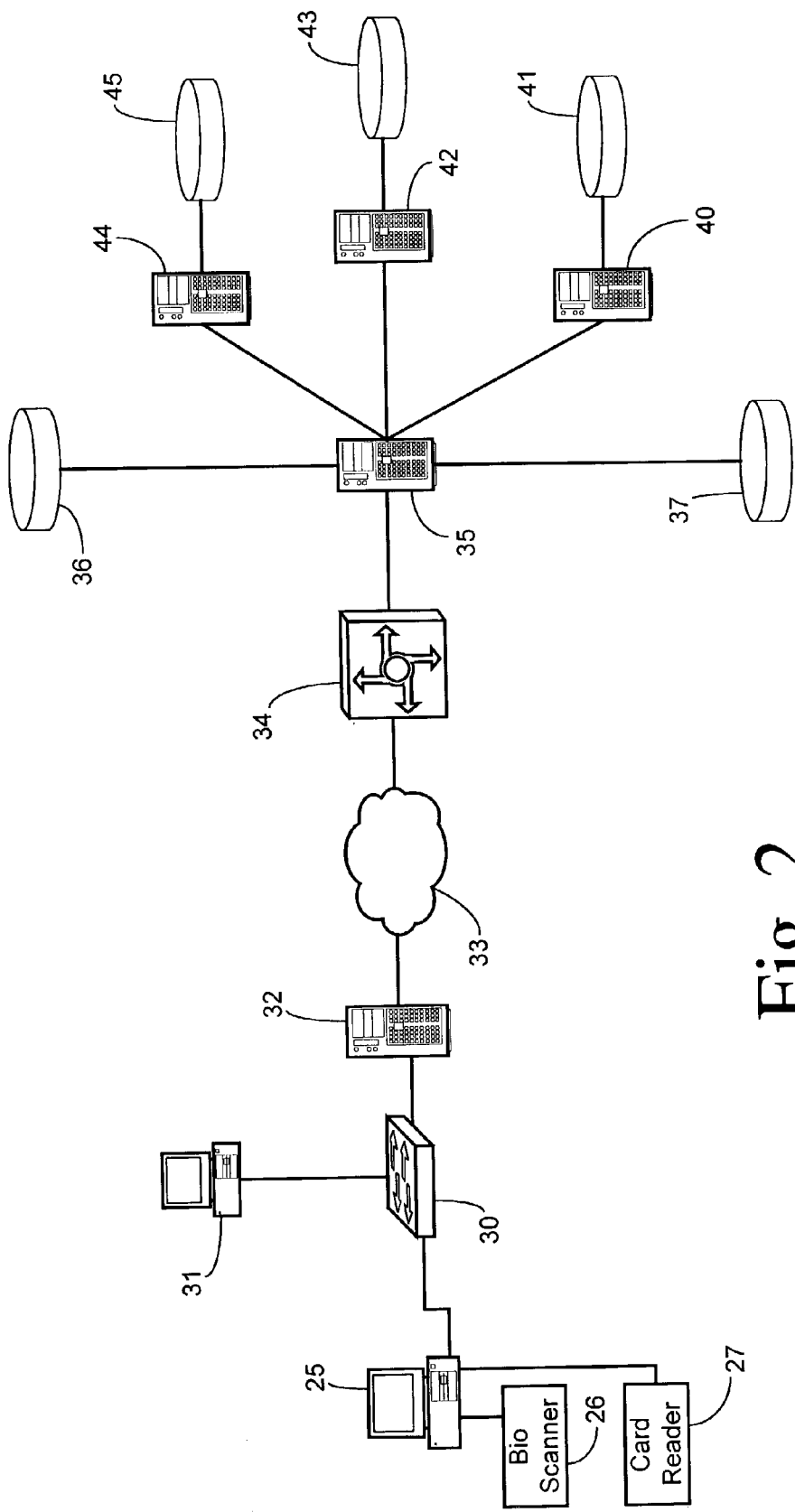
FIG. 2 is a block diagram showing one preferred embodiment of a network architecture for performing an initial biometric authentication followed by substantially continuous re-authentication using biometric data transmitted within the Ethernet/802.3 preamble.

A preferred network architecture of the present invention is shown in FIG. 2. A client computer 25 (i.e., a supplicant) is interconnected with authentication devices including a biometric scanner 26 (such as a video image sensor or a fingerprint sensor) and a card reader 27 (e.g., for reading a portable magnetic card storing a personal digital public-key certificate of a user). Computer 25 is also connected with a LAN switch or wireless access point which is referred to herein as an authenticator 30. Authenticator 30 may be configured with company, network group, proxy, and other settings from a network management workstation 31. Computer 25 and authenticator 30 are Ethernet/802.3 devices.

Authenticator 30 is connected within its LAN with a local proxy RADIUS server 32 which is interfaced to an internetwork 33 such as the Internet. In a remote network (e.g. a back-end network), a layer-4 access switch 34 couples an authentication server/router 35 to internetwork 33. Authentication server 35 is connected with an authentication routing information database 36 and an accounting database 37. Routing information is used during the authentication of a client to direct different types of authentication credentials or data to corresponding verification servers including a biometric verification server 40, a password verification server 42, and a certificate verification server 44. The services of authentication server 35 may be provided on a pay-per-use basis. Usage may be recorded in accounting database 37 so that a service provider can obtain compensation for usage. Messages between authentication server 35 and the other components of the back-end network may preferably be secured using the IPSEC protocol.

Biometric templates of authorized users are stored in a biometric template database 41 connected to biometric verification server 40. Usernames and passwords (e.g., MD5 passwords) of authorized users are stored in a username/password database 43 connected to password server 42. Digital certificates of authorized users are stored in a certificate database 45 connected to certificate server 44.

Figure 3:
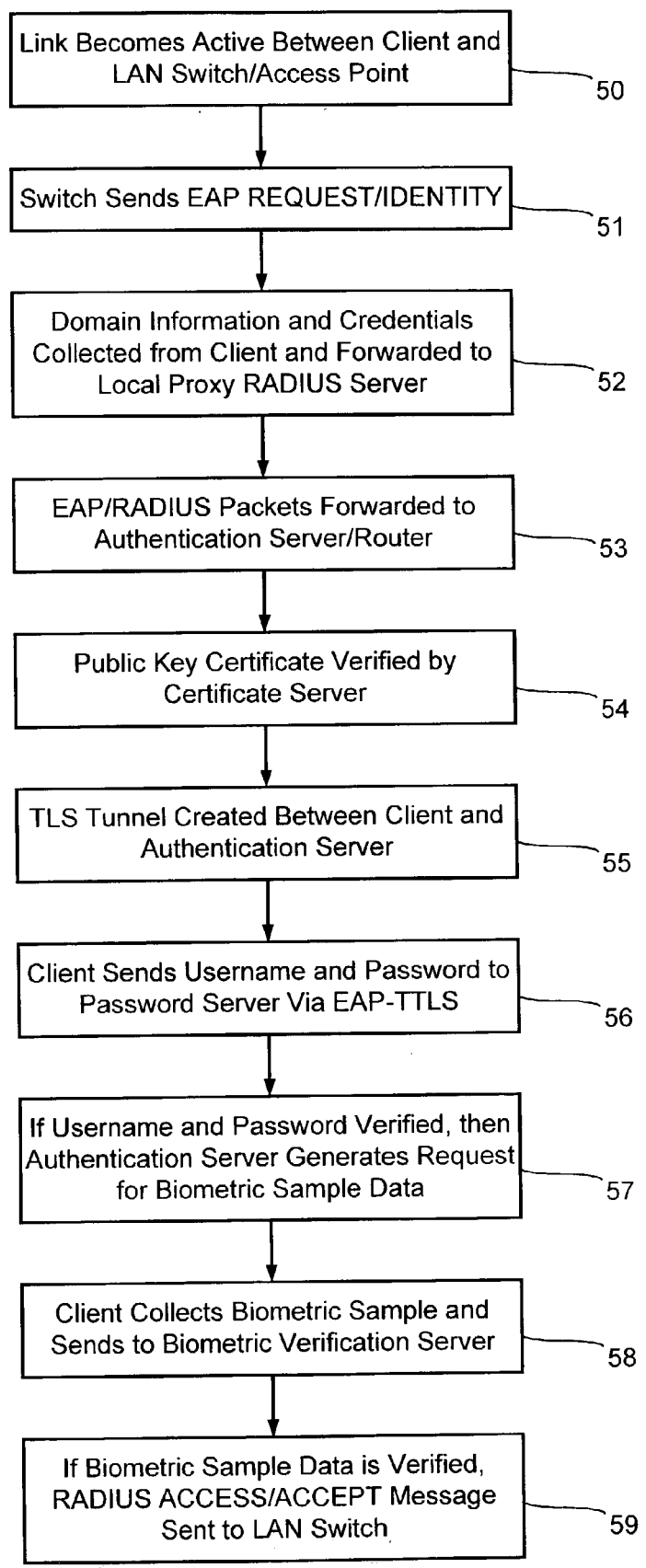
FIG. 3 is a flowchart of a more detailed method used with the network architecture of FIG. 2 for the initial authentication.

Authentication using the network architecture of FIG. 2 is accomplished using a preferred method shown in FIG. 3. In step 50, a link between the client computer and the authenticator LAN switch or wireless access point becomes active. In step 51, the authenticator sends an EAP REQUEST/IDENTITY message to the client. In the presently described embodiment, authentication using non-biometric credentials precedes a biometric authentication since the biometric authentication may take a relatively greater length of time and use more processing resources than checking a username and password or a digital certificate.

In step 52, company, group, and authentication domain information is collected from the client and/or management workstation, if necessary. This information is put into EAP message packets and encapsulated by the authenticator using RADIUS before being forwarded to the local proxy RADIUS server. These packets and subsequent RADIUS-encapsulated EAP packets are forwarded to the back-end authentication server via the Internet in step 53 (assuming the authentication server recognizes the company and group as one for which is possess authentication information).

In step 54, a digital public-key certificate of the user is verified by the certificate server. Specifically, the authentication server may issue a request for certificate data which is relayed to the client computer using a RADIUS-encapsulated EAP message (which is stripped down to an EAP message by the authenticator and forwarded to the client computer). The client computer collects the user's certificate (e.g., using the card reader) and the data is sent back to the authentication server using EAP and RADIUS.

If the certificate is valid, then a secure Transport Layer Security (TLS) tunnel is created in step 55 between the client computer and the authentication server using EAP and tunneled TLS (EAP-TTLS) which is already used with 802.11 wireless access points. In step 56, the client computer sends a username and password to the password server via the EAP-TTLS tunnel (e.g., in response to a username/password request from the authentication server). The username and password may be input by the user via a keyboard connected to the client computer, for example.

If the username and password are verified, then the authentication server generates a request sent via the EAP-TTLS tunnel to the client for biometric sample data of the attendant user in step 57. In step 58, the client collects a biometric sample and sends the data to the biometric verification server via the authentication server. Since the already verified certificate and username/password signify a claimed identity of the user, a single biometric template corresponding to the claimed identity can be identified and used in a biometric comparison. Unless the biometric sample data matches this single template, an ACCESS-DENY message is sent to the authenticator. In an alternative embodiment, a biometric identification may be conducted alone or prior to other types of identification so that no claimed identity is signified by the user. Instead, a biometric sample is compared with a group of biometric templates for a plurality of authorized users in an attempt to determine the identity of the user and to grant access to the desired network resources if a match is found.

In step 59, if a biometric sample is verified by the biometric verification server, then a RADIUS ACCESS/ACCEPT message is sent to the authenticator and the client/user is granted access to the LAN by enabling non-authentication traffic to pass through the port to which the client is connected.

The embodiment of FIGS. 2 and 3 demonstrates an advantageous security system employing multiple authentication factors or credentials in a network architecture providing efficient use of resources in a scalable manner. By separating authentication verification services from authentication transport services, verification services can be consolidated in a cost effective and highly secure manner. In addition, existing hardware devices may be incorporated into the transport services since support for only existing, nonproprietary protocols (e.g., EAP and RADIUS) is needed.

Following the initial biometric authentication of the user, the present invention employs substantially continuous (i.e., periodic) biometric monitoring of the identity of the user wherein biometric data sent from the client to the LAN switch using the Ethernet/802.3 preamble. The preamble was originally defined to provide for synchronization of transmitters and receivers in a link and to facilitate collision detection when two transmitters contend for the LAN bus at the same time. Currently, many LAN installations are now using a full-duplex architecture wherein separate wire pairs are used by each node for transmitting to and receiving from a LAN switch. Thus, there are no collisions and there is no real need for a preamble. Nevertheless, the preamble is always transmitted in order to maintain compatibility. As a consequence, a portion of the bandwidth of the link is wasted.

Figures 4, 5, 6, 7:
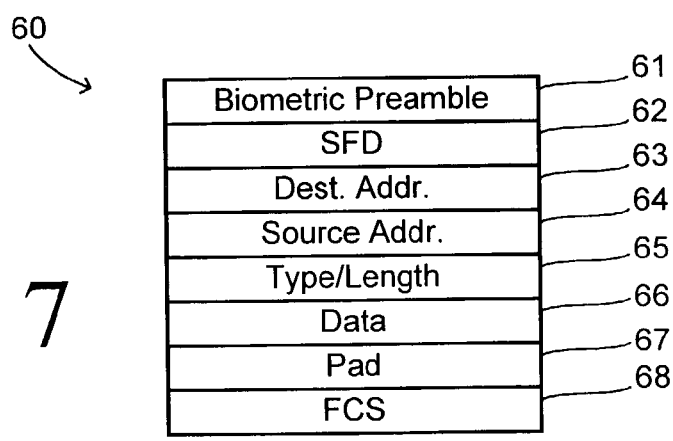
FIG. 4 is a block diagram of an EAP RESPONSE/CONTINUOUS packet.
FIG. 5 is a block diagram of an authenticated EAP packet.
FIG. 6 is a block diagram of a biometric preamble of the present invention.
FIG. 7 is a block diagram showing an Ethernet/802.3 frame with a biometric preamble.

The present invention modifies the client and the LAN switch so that biometric data utilized for continuous biometric authentication is inserted into the preambles of Ethernet/802.3 frames by the client and then extracted by the LAN switch. The basic message unit for the biometric data is a conventional EAP RESPONSE/CONTINUOUS packet as shown in FIG. 4, comprised of a 1-byte Code, a 1-byte Identification, a 2-byte Length, a 1-byte Type, and a variable length data field or payload. In the preferred embodiment, the data field contains the biometric variance data which may only require 3 bytes as shown. Raw biometric data can alternatively be transmitted, but pre-processing of the biometric at the client to generate the variance data reduces the amount of data needing to be sent without any significant reduction in overall security. In the event that variance data occupies more than 3 bytes or if raw biometric data is transmitted, then a longer data field or multiple EAP frames can be used.

To inhibit spoofing of data that is sent in the Ethernet/802.3 preamble, an authenticated EAP packet is created as shown in FIG. 5 including a hashed message authentication code (HMAC) section. Preferably, the hashed code may be calculated based on the entire EAP CONTINUOUS/RESPONSE packet and using any keyed hash algorithm such as HMAC-MD5 or HMAC-SHA1. Each row in FIG. 5 represents a total of 4 bytes. An HMAC-MD5 authentication tag is appended as the first 16 bytes at the beginning of the authenticated EAP packet. Known software functions and routines may be employed to calculate the HMAC-MD5 authentication tag, which produces a tag having a predetermined size regardless of the size of the data. The calculation preferably employs one or more keys that may be exchanged between the client and the LAN switch immediately following the original biometric authentication of the client. Calculation of the hash function may be performed as described in M. Bellare et al, Message Authentication using Hash Functions—The HMAC Construction, RSA Laboratories' CryptoBytes, Vol. 2, No. 1, Spring 1996, for example.

The authenticated EAP packet of FIG. 5 is too large to be transmitted in one Ethernet/802.3 preamble which is 7 bytes in length. Instead, the authenticated EAP packet is broken into fragments for transmission one at a time. As shown in FIG. 6, each fragment may preferably be 4 bytes in length. When broken up, the fragments are given a sequence number so that they can be reassembled into the original authenticated EAP packet by the receiving LAN switch. The sequence number can be a 1-byte number that is pre-pended to its respective fragment and then the two are inserted into the first 5 bytes of the 7-byte preamble.

FIG. 7 shows the contents of an Ethernet/802.3 packet according to the present invention. An Ethernet/802.3 frame 60 includes a biometric preamble 61 which contains an EAP fragments as shown in FIG. 6. Preamble 61 is followed by a start of frame delimiter (SFD) 62, a destination address 63, a source address 64, and a Type/Length field 65. Next in Ethernet/802.3 packet 60 comes a data field 66 and a data pad or filler 67. Lastly, a frame check sequence (FCS) 68 is included.

Biometric preamble 61 as used herein performs a self-contained function. The other fields 62–68 of frame 60 operate independently from biometric preamble 61 and are used in a conventional manner to carry traffic corresponding to a client application (e.g., the application that is being secured via the biometric authentication).

Figure 8:
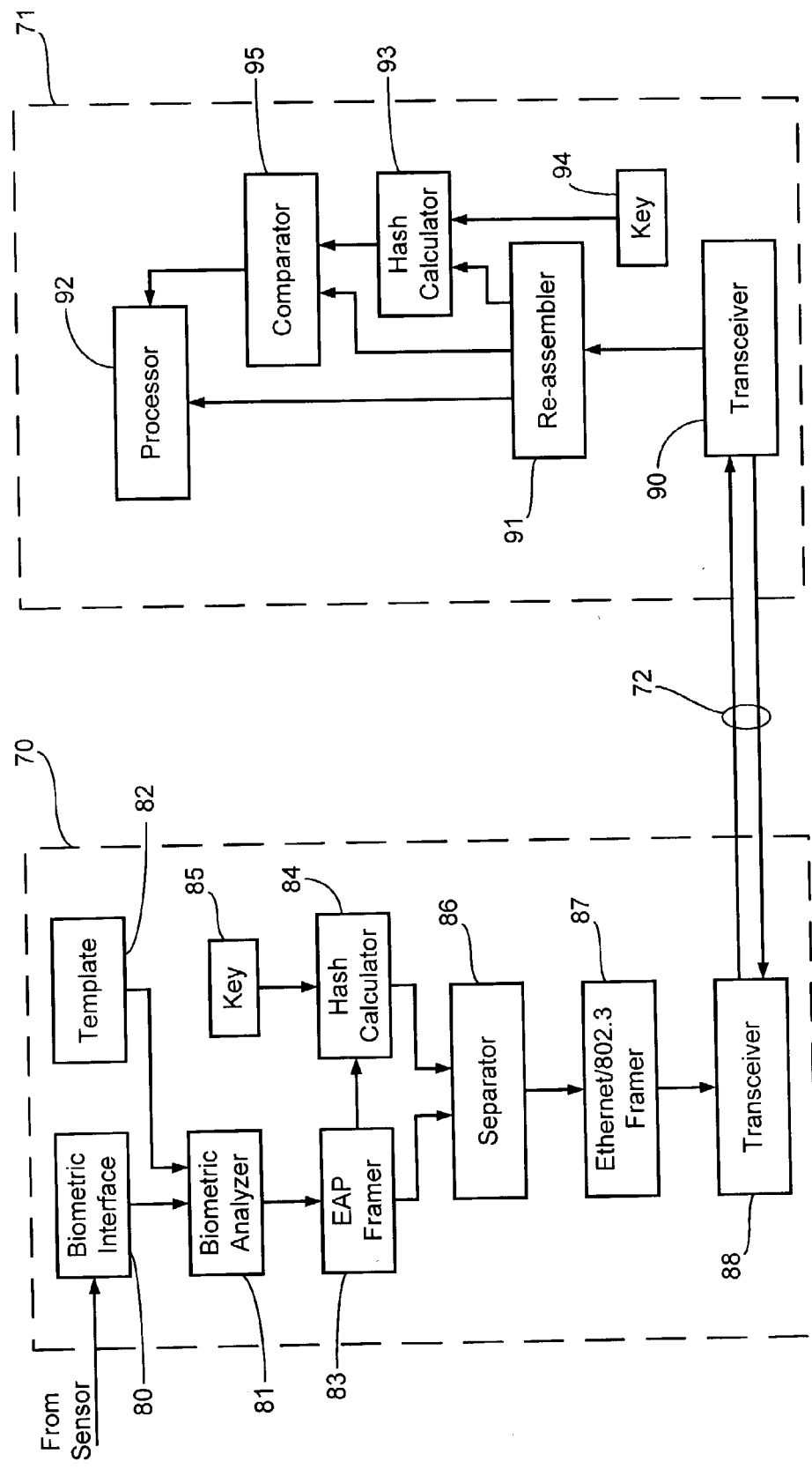
FIG. 8 is a block diagram showing a client and a network switch of the present invention in greater detail.

FIG. 8 shows a client 70 and a LAN switch 71 which are interconnected by a communication channel 72. As part of a full-duplex Ethernet/802.3 LAN, channel 72 may be comprised of a UTP (unshielded twisted pair) cable, for example.

Client 70 includes a biometric interface 80 for connecting to and controlling a biometric sensor (not shown) such as a digital image sensor. A biometric sample obtained for the attendant user of client 70 is captured by biometric interface 80 and provided to a biometric analyzer 81. A biometric template of the user is obtained during initial authentication and is stored in a template memory 82. The stored template is provided to biometric analyzer 81 for comparison with the current biometric sample. The resulting biometric variance data is input to a EAP framer in step 83. Alternatively, the raw biometric data may be input to EAP framer directly from biometric interface 80.

In a preferred embodiment using an authentication tag, the resulting EAP frame is input to a hash calculator 84 which receives from memory 85 a hash key that was also stored during the initial authentication. Both the EAP frame from framer 83 and the HMAC-MD5 authentication tag from hash calculator 84 are input to a separator 86 which fragments them into 4-byte fragments and assigns sequence numbers, preferably in a serial order to facilitate re-assembly at the receiving end.

The fragments and sequence numbers are inserted into respective Ethernet/802.3 preambles by an Ethernet/802.3 framer 87. The remainder of the Ethernet/802.3 frames include data provided by a client application (not shown). The complete Ethernet/802.3 frames are provided to a transceiver 88 for transmitting to LAN switch 71 over channel 72.

The Ethernet/802.3 frames are received in LAN switch 71 by a transceiver 90. A re-assembler 91 receives the Ethernet/802.3 frames, extracts the authenticated EAP fragments and their sequence numbers, and re-assembles the authenticated EAP packet including the authentication tag that was calculated by the client. The EAP packet (i.e., without the authentication tag) is input to a hash calculator 93 which receives a corresponding key from a key memory 94. Hash calculator 93 performs a calculation identical to the calculation done by calculator 84 in client 70. The tag sent by client 70 is provided by re-assembler 91 to a comparator 95 which also receives the tag calculated by hash calculator 93. Assuming the data has not been tampered with by another party connected in the network, the calculated HMAC-MD5 result will be the same as the one sent by client 70 as part of the authenticated EAP packet. A processor 92 receives a signal from comparator 95 indicative of whether the authentication tags match. If the tags match, then processor utilizes the biometric variance data or the biometric raw data from re-assembler 91 to make a determination whether the user should continue to be authorized to use the client.

Figure 9:
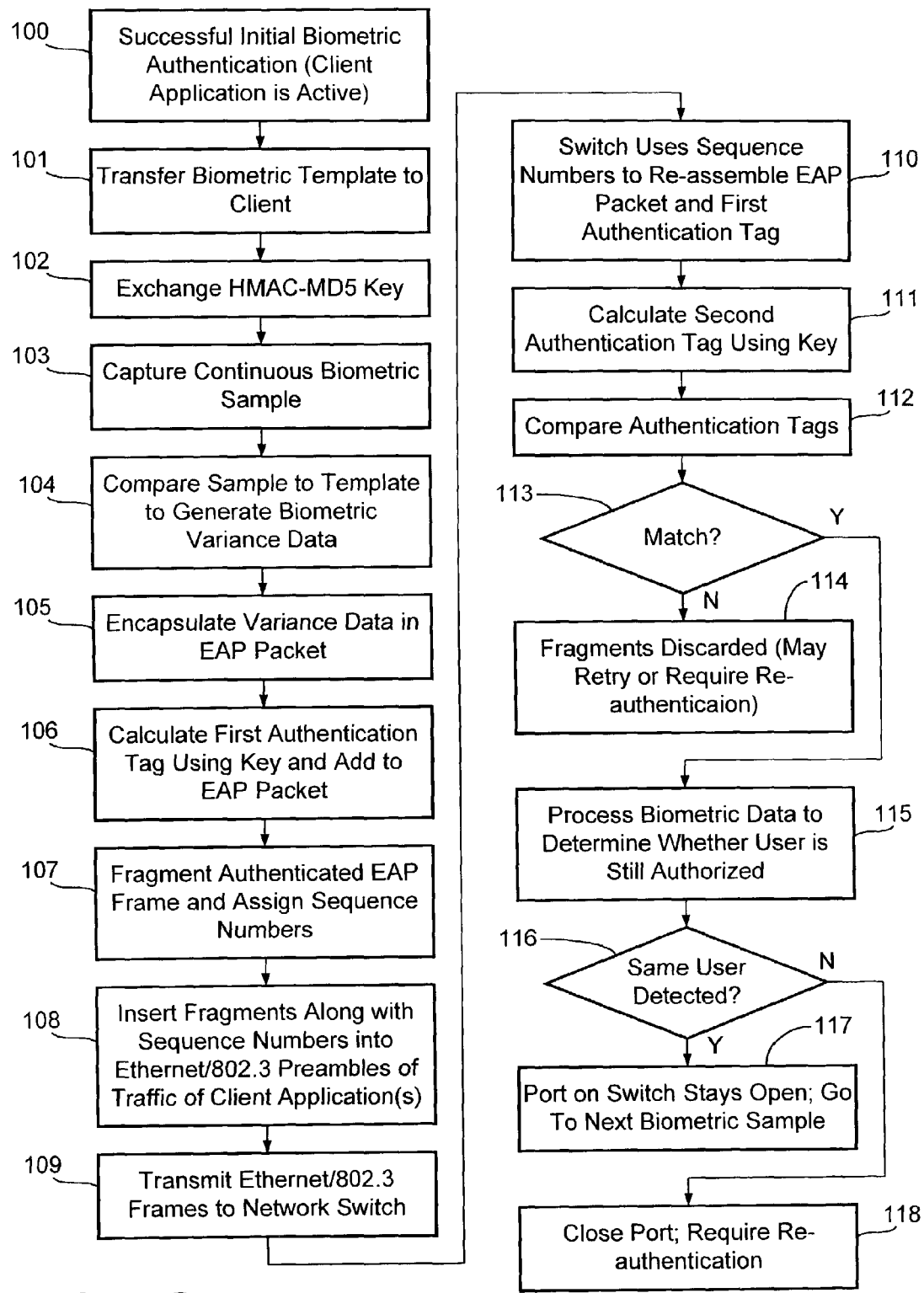
FIG. 9 is a flowchart of a preferred method of the invention using the Ethernet/802.3 preamble.

The components of FIG. 8 preferably operate according to a method shown in FIG. 9. In step 100, an initial biometric authentication is successfully completed (i.e., a client application using a network link between the client and the LAN switch or access point has been authorized and is active). The matching biometric template from the successful authentication is transferred from the network to the client is step 101. In step 102, one or more HMAC-MD5 keys are securely exchanged between the client and the LAN switch. Thereafter, biometric sample data corresponding to the user is captured substantially continuously (e.g., periodically) in step 103.

Each periodic biometric sample is compared to the authenticated user's biometric template in step 104 to generate the biometric variance data. The variance data is encapsulated in an EAP packet in step 105. The client calculates a first authentication tag using the predetermined key and adds it to the EAP packet in step 106. The resulting authenticated EAP packet is fragmented and sequence numbers are assigned in step 107. The fragments and sequence numbers are inserted into the Ethernet/802.3 preambles of outgoing frames being transmitted to the LAN switch in response to other client applications in step 108. For example, the fragments and sequence numbers may be stored in a queue for waiting until an Ethernet/802.3 frame is being assembled for transmission. The Ethernet/802.3 frames and the inserted biometric EAP fragments are transmitted to the LAN switch in step 109.

After being received by the LAN switch, the sequence numbers associated with respective fragments are used in step 110 to re-assemble the EAP packet and the first authentication tag. Using the re-assembled EAP packet (minus the first authentication tag), a second authentication tag is calculated in step 111 using the hashing key that was commonly distributed to the client and the LAN switch. The first and second authentication tags are compared in step 112. A check is made in step 113 for matching tags. If no match is detected, then the fragments are discarded in step 114. Optionally, the LAN switch may 1) retry to re-authenticate using the next continuous biometric sample or may request that a sample be collected, or 2) close the corresponding LAN port and require full re-authentication.

If step 113 determines that the authentication tags match, then the biometric data is processed in step 115 to determine whether the user should still be authorized to use the protected network resource (e.g., LAN port). This processing may be comprised of analyzing biometric variance data so as to determine the likelihood of the same person still being present. Alternatively, the processing may comprise manipulation of raw biometric data and comparison with the biometric template of the user. A check is made in step 116 to determined whether the same user is detected. If the same authenticated user is detected, then the network resource (e.g., port on LAN switch) stays open without modification and the next biometric sample may be processed. If the same user is no longer detected, the LAN port is preferably closed and a full re-authentication is required in order to again access the LAN port.

What is claimed is:

1. A method of continuous biometric authentication of a client connected to a network switch, wherein said client and said network switch exchange Ethernet/802.3 frames associated with a client application, and wherein said client and said network switch are coupled by a full-duplex Ethernet/802.3 communication channel, said method comprising the steps of:

capturing a biometric data sample of a user of said client;

encapsulating biometric data in an authentication protocol message frame;

separating said authentication protocol message frame into a sequence of a plurality of fragments, each fragment having a predetermined number of bytes;

assigning a respective sequence number to each of said fragments; and inserting each of said fragments with its respective sequence number in a respective preamble of a respective one of a plurality of Ethernet/802.3 frames associated with said client application that are being transmitted from said client to said network switch.

2. The method of claim 1 further comprising the steps of:

reassembling said authentication protocol message frame and said first authentication tag in said network switch according to said respective sequence numbers; and processing said biometric data to determine whether said user is authorized to use said client.

3. The method of claim 1 further comprising the steps of:

calculating a first authentication tag in response to said authentication protocol message frame; and appending said first authentication tag to said authentication protocol message frame for fragmenting and transmission in respective preambles.

4. The method of claim 3 further comprising the steps of:

reassembling said authentication protocol message frame and said first authentication tag in said network switch according to said respective sequence numbers;

calculating a second authentication tag in response to said reassembled authentication protocol message frame;

comparing said first and second authentication tags;
if said tags match then processing said biometric data to determine whether said user is authorized to use said client.

5. The method of claim 4 further comprising the step of: closing said communication channel if said tags do not substantially match.

6. The method of claim 4 wherein said first and second authentication tags are calculated over an entire authentication protocol message frame.

7. The method of claim 4 wherein said first and second authentication tags are calculated using a hash function.

8. The method of claim 7 wherein said hash function is comprised of HMAC-MD5.

9. The method of claim 7 wherein said hash function is comprised of HMAC-SHA1.

10. The method of claim 2 wherein an initial biometric authentication is performed prior to exchanging said frames associated with said client application, wherein a matching biometric template used in said initial biometric authentication is transmitted to said client, and wherein said method further comprises the step of:
said client comparing said biometric data sample with said matching biometric template to generate variance data;
wherein said biometric data encapsulated in said authentication protocol message frame is comprised of said variance data.

11. The method of claim 1 wherein said predetermined number of bytes for each of said fragments is equal to 4.

12. The method of claim 1 wherein each respective sequence number is appended at the beginning of each respective fragment and is comprised of 1 byte.

13. The method of claim 12 wherein each respective sequence number is transmitted in a first byte of a respective preamble and wherein each respective fragment is transmitted in a second through a fifth byte of a respective preamble.

14. The method of claim 1 wherein said authentication protocol message frame is comprised of an extensible authentication protocol (EAP) packet.

15. A client for continuous biometric authentication for a full-duplex network session on an Ethernet/802.3 network switch, wherein said client and said network switch exchange Ethernet/802.3 frames associated with a client application, comprising:
an authentication protocol framer for encapsulating biometric data into an authentication protocol message frame;
a calculator for calculating a first authentication tag in response to said authentication protocol message frame;
a separator for forming a sequence of a plurality of fragments of said authentication protocol message frame and said first authentication tag and for appending a respective sequence number to each of said fragments; and
an Ethernet/802.3 framer for inserting each of said fragments with its respective sequence number in a respective preamble of a respective one of a plurality of Ethernet/802.3 frames associated with said client application being transmitted from said client to said Ethernet/802.3 network switch.

16. The client of claim 15 further comprising;
a biometric interface for collecting a biometric sample corresponding to a user of said client;
a memory for storing a biometric template corresponding to said user; and
a biometric analyzer for comparing said biometric sample with said biometric template to generate said biometric data encapsulated into an authentication protocol message frame as biometric variance data.

17. The client of claim 15 wherein said calculator uses a hash function to calculate said first authentication tag.

18. A network switch providing substantially continuous biometric authentication for a full-duplex network session with a client, wherein said client and said network switch exchange Ethernet/802.3 frames associated with a client application, wherein respective preambles of said Ethernet/802.3 frames include respective fragments and sequence numbers of an authentication protocol message frame which encapsulates biometric data corresponding to captured biometric data of a user of said client, said network switch comprising:
a re-assembler for recovering said fragments and said sequence numbers from said respective preambles and for reassembling said authentication protocol message frame from said fragments in response to said sequence numbers; and
a processor for processing said biometric data to determine whether said user is authorized to use said client.

19. The network switch of claim 18 wherein said respective preambles further include respective fragments and sequence numbers of a first authentication tag calculated by said client in response to said authentication protocol message frame, said network switch further comprising:
a calculator for calculating a second authentication tag in response to said reassembled authentication protocol message frame; and
a comparator for comparing said first and second authentication tags, wherein said network switch blocks further exchange of said Ethernet/802.3 frames associated with said client application if said first and second authentication tags do not match.

* * * * *